No. 807,483. PATENTED DEC. 19, 1905.
F. B. MORSE.
FISH SCREEN FOR IRRIGATING DITCHES, &c.
APPLICATION FILED JAN. 19, 1905.

Witnesses
Jas. H. Blackwood
S. Randolph, Jr.

Inventor
Frank B. Morse
by D. A. Gourick
Attorney

UNITED STATES PATENT OFFICE.

FRANK B. MORSE, OF WALLA WALLA, WASHINGTON.

FISH-SCREEN FOR IRRIGATING-DITCHES, &c.

No. 807,483.      Specification of Letters Patent.      Patented Dec. 19, 1905.

Application filed January 19, 1905. Serial No. 241,877.

*To all whom it may concern:*

Be it known that I, FRANK B. MORSE, a citizen of the United States, residing at Walla Walla, in the county of Wallawalla and State of Washington, have invented certain new and useful Improvements in Fish-Screens for Irrigating-Ditches, &c., of which the following is a specification.

In the Western country, where the land is irrigated by means of ditches leading off from natural streams, it has been found necessary to provide screens at the mouth of the ditches to prevent fish from following the course of the ditch and eventually become stranded on the land. As these screens are stationary, they not only stop the fish, but also floating leaves and other debris, so that eventually the screen becomes clogged and impedes the flow of water therethrough or stops it altogether.

My invention contemplates improving on the fixed screen by inserting a rotatable screen having paddles or vanes to keep the screen in motion, so that fish are turned back, but debris is allowed to pass under it, the cylinder being vertically adjustable, so as to accommodate itself to the amount of debris passing the screen.

The construction and advantages of my invention will be fully explained hereinafter and illustrated in the accompanying drawings, in which—

Figure 1:
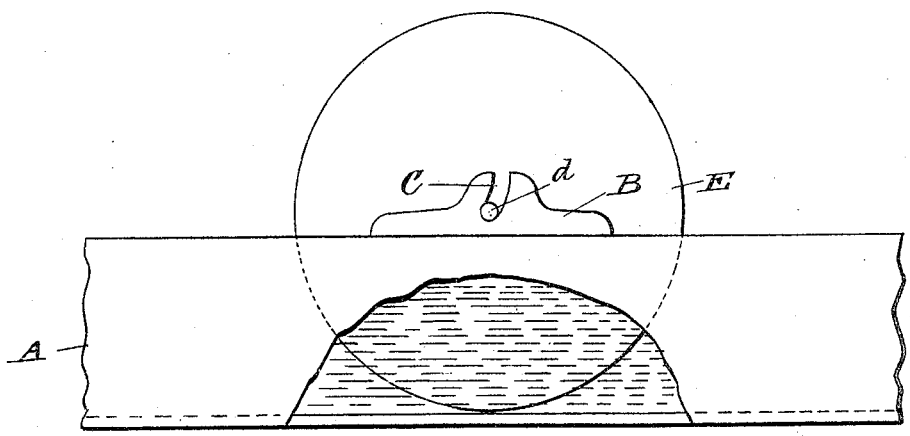
Figure 2:
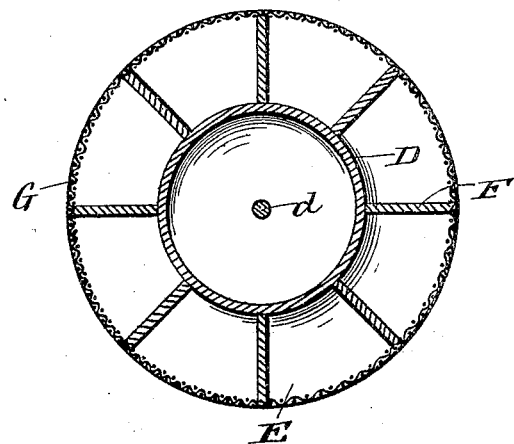

Figure 1 is a side view of a fragment of a ditch or flume, showing my screen in position; and Fig. 2, a view in cross-section through the screen-cylinder.

In the drawings similar reference characters indicate corresponding parts in the two views.

A represents the flume, having on the upper edge of each side thereof a journal-bearing B, having a slot C therein curved away from the entrance to the flume and upwardly.

D represents a cylinder journaled in slot C by means of bar $d$, having a flange E on each side and paddles or vanes F, secured to the cylinder and extending outwardly flush with the edge of flanges E.

G represents a wire-gauze covering secured to the outer edges of flanges E and paddles F.

It will be understood that in operation the water passing through the flume or ditch will keep the cylinder D in constant rotation and that any leaves or other debris that may be washed into the flume will pass under the cylinder, but that the agitation of the water by the paddles F frightens the fish that may enter the flume and causes them to turn back, or, at any rate, the screen G on the outside of the cylinder will prevent the fish going beyond it. Should a large amount of debris be carried into the flume at one time, the slots C, being curved upwardly and away from the entrance to the flume, will allow the cylinder to rise to let the debris pass.

Having thus described my invention, what I claim is—

1. A fish-screen for ditches, &c., comprising a cylinder rotatably mounted in the ditch, paddles rigidly secured to said cylinder, and wire-gauze fabric secured to the edges of said paddles, substantially as shown and described.

2. In combination with a flume, journal-bearings secured thereto, a cylinder journaled in said bearings, paddles rigidly secured to said cylinder, and a wire-gauze fabric secured to the edges of said paddles, substantially as shown and described.

3. In combination with a flume, blocks secured to the upper edges thereof having slots therein curved away from the entrance to the flume and upwardly, a cylinder journaled in said slots, paddles secured to said cylinder, and wire-gauze fabric secured to the edges of said paddles, substantially as shown and described.

4. A fish-screen for ditches, &c., comprising a cylinder rotatably mounted, paddles secured upon said cylinder, and wire-gauze fabric secured to the outer edges of said paddles, substantially as shown and described.

5. A fish-screen for ditches, &c., comprising a cylinder rotatably mounted, paddles secured upon said cylinder, a circular flange at each end of the cylinder and extending outwardly level with the outer edges of the paddles, and a wire-gauze fabric secured to the outer edge of said paddles and flanges, substantially as shown and described.

6. In combination with a flume, blocks secured to the upper edges thereof having slots therein curved away from the entrance to the flume and upwardly, a cylinder journaled in said slots, paddles secured to said cylinder, a circular flange at each end of the cylinder and extending outwardly level with the outer edges of the paddles, and a wire-gauze fabric secured to said paddles and flanges, substantially as shown and described.

In testimony whereof I hereto affix my signature in the presence of two witnesses.

FRANK B. MORSE.

Witnesses:
 LESTER S. WILSON,
 R. STRAUSS.